Dec. 8, 1970 F. H. McPHERSON ET AL 3,546,686

RANDOM ACCESS SYSTEM

Original Filed Jan. 3, 1966 2 Sheets-Sheet 1

INVENTORS
FRANK H. McPHERSON
ERNESTO G. SEVILLA

BY Edward M. Farrell

ATTORNEY 3,546,686
RANDOM ACCESS SYSTEM

Frank H. McPherson, Rosemont, and Ernesto G. Sevilla, Norristown, Pa., assignors to Sperry Rand Corporation, New York, N.Y., a corporation of Delaware Continuation of application Ser. No. 518,142, Jan. 3, 1966. This application Sept. 22, 1969, Ser. No. 862,154
Int. Cl. G11b *5/48, 27/36, 25/04*
U.S. Cl. 340—174.1 4 Claims

ABSTRACT OF THE DISCLOSURE

This device deals with a means for readily determining upon which track of a multi-track recording medium there is found the information which is being sought. The information is arranged on the tracks in segments and a certain part of the processable information in each segment is related to a corresponding part of the processable information in every other segment such that, for instance, the corresponding parts of information become progressively higher in value as they are laid out around the track in a direction which is opposite to the direction in which the record medium is being rotated. Accordingly, the system attempts to detect a condition wherein said corresponding parts or information are first "less than" the information being sought and thereafter either "equal to" or "greater than" the information being sought. At this latter time the system makes a decision that is in the track of corresponding information last compared that the information being sought is to be found.

This is a continuation of application S.N. 518,142 filed Jan. 3, 1966, now abandoned.

This invention relates to random access systems, and more particularly to means for detecting the location of stored information in a minimum time.

In computer systems, mass storage memory devices, such as magnetic drums or discs, are used to store bits of information. In general, these bits of information are stored on a plurality of tracks. A transducer element may be moved to a selected area to perform a reading or writing operation. The recording on the record medium may be formed by magnetizing certain areas on the surface of the medium, as is well known.

If there is a large amount of information stored on a record medium and it is desired to read out the information quickly, means must be employed to move the transducer element quickly to the desired track. Once the transducer element is disposed over a desired track, the coded recorded information on the track will permit certain portions of the track, called sectors, to be read.

Generally, information of a recording medium has an identifying or track address signal which identifies a particular track involved.

For example, in a system wherein one hundred information tracks are provided on a magnetic disc, the information tracks may be identified by binary numbers which could, for example, range from 00 to 99. Each of the information tracks in turn may involve a hundred or more sectors each of which may also be identified by binary numbers recorded in the form of magnetized bits on the recording medium. In some cases, even the individual sector may be broken down into individual records each including an identifying number.

One of the first operations involved in a random access system is to select the particular track onto which information is to be written or read. Then the particular sector is selected prior to reading or writing information. As mentioned, the sectors may also be broken down, however, for purposes of explanation it may be assumed that each sector includes only a single record.

In most operations, a general computer is employed in conjunction with the recording medium used for mass storage to perform the various operations such as addition, subtraction and controlling various input and output operations. These computer devices generally include storage devices such as core memories, for example, to provide temporary storage of information while the computers are in operation.

While it may be physically possible in some cases to store information in the core memory along with address identifying signals, it becomes impractical when a large number of tracks or sectors are involved. Extremely large memory devices would be required when large amounts of information in the order of ten thousand or more records or sectors are involved.

In accordance with the present invention, a random access positioning system includes a record medium having a plurality of tracks each broken down into sectors or records. Each sector or record includes information or identifying signals arranged in some predetermined relationship. In addition there is included an index track which has the highest order identifying signals from each track. Means are provided for sequentially comparing the identifying signals from the index track with incoming signals from a computer to determine the track on which the signals from the computer is located.

If it is desired to select a particular sector or record from the disc, incoming address information from a memory in the computer system, for example, is sequentially compared with the stored signals on the index track, which is read by a fixed transducer disposed over the index track. By comparison, it may be determined that the incoming sector address signal from the computer is greater than, equal to or less than the signals read from the index track. By determining these conditions, it is then possible to obtain the particular track address in which the desired sector involved is located. Once the particular track is found, similar comparison means may be employed to locate the specific record or sector desired.

Advantages of the present invention will be apparent from a reading of the following specification and claims, in conjunction with the accompanying drawing, in which:

Figure 1:
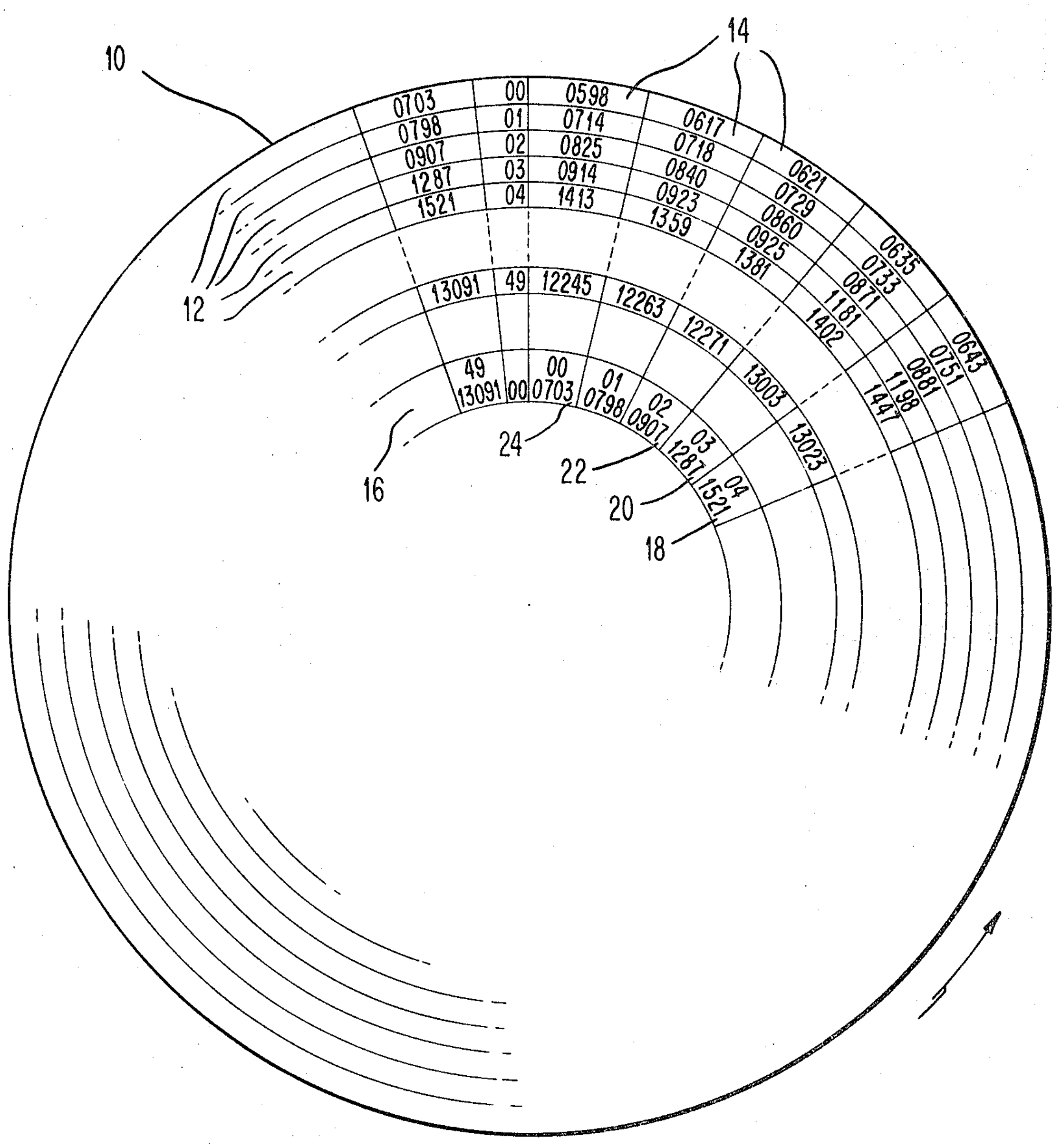
FIG. 1 illustrates a magnetic disc on which signals are stored.

Referring particularly to FIG. 1, a magnetic disc 10 is used to store various types of information. For example, the information may include binary numbers representing names or addresses of individuals, social security numbers, accounts receivables or various other types of information to be processed through a computer.

The magnetic disc 10 includes a plurality of information tracks 12. In the example illustrated, there are 50 tracks identified as being tracks 00–49. Each of the tracks is broken down into a number of sectors or records 14. The record numbers may start on track "00" with "0598" and written in order until the required number of records on one track of the disc is filled. The recording then continues from track to track.

The arrangement of the signals on the disc 10 may be in a predetermined numerical order, although other arrangements other than numerical sequences may be employed.

If a numerical order is used, the differences in the numbers in consecutive order may vary in a random way even though the numerical order is maintained. On track 00, records numbered from 0598 to 0703 may be stored. When track 00 is filled, the next track, which is track 01 stores information with number identifiers identified by the numbers 0714 to 0798. The sequence is continued from track to track until finally on the last track 49, the identifying records are numbered from 12245 to 13091. Now it should be understood that the numbers discussed above could actually be alpha-numeric information. For instance, the identifiers could be last names of employees where the letter A would have a binary value less than the letter B.

The highest order numbers of each of the records on the various tracks 00 to 49 are also stored as index numbers, on an additional or index track 16, which may be associated with a fixed transducer element not illustrated. For example, the highest order number on track 00 is 0703. This number is stored on an area 24 of the index track. In addition to the highest order identifying number the track address 00 at which this highest order identifier number is located is also stored on the area 24. In like manner, all of the highest order identifying numbers from the tracks are stored on the index track 16. Also as mentioned, the particular track address signals associated with each highest order identifying number is also stored.

For purposes of explanation, assume that the disc 10 is being moved in a counter clockwise direction. Also assume that the record being sought is identified by the number 0871, with this number being supplied by a computer. The number 0871 which actually may represent a social security number or a name, will be stored in a shift register. This information may be in the form of binary signals adapted to be read out of the shaft register serially bit by bit.

The identifier characters or key character, representing the highest order alpha-numeric information from each of the tracks, are read out from the index track 16 by a fixed transducer (not illustrated) and may be in the form of binary signals capable of being read bit by bit. The highest order bit is read first.

The binary signals representing 0871 are compared with the binary signals read from the index track 16. Means for detecting a condition wherein the 0871 is "greatei than," "less than" or "equal to" the signals sequentially read from the track 16 is provided. Dependent upon the position of the transducer with respect to the disc at the time of the start of the operation, the compared signals from the track 16 may be greater or less than 0871.

For example, consider that the fixed transducer is disposed over sector 24 when the comparison operation starts. The first comparison indicates that index number 0703 is less than 0871. Subsequent comparisons will continue to indicate that the next numbers or signals read from the track 16 are less than 0871. Finally, however, when the disc 10 has sufficiently rotated counter clockwise the comparison of 0871 with the next index numbers will indicate "a greater than" condition. When "less than" condition is followed by a "greater than" condition, the system recognizes the track sector to be sought is stored on the track identified by the last area read from the index track to wit, the 02 track in our example. When this condition is reached, the stored track number may be read out and used for subsequent operations involving the movement of a movable transducer to the selected track.

By coincidence, the incoming signal from the computer may be equal to an identifying signal read from the index track. An "equal" condition is regarded the same as a "greater than" condition. Consequently a "less than" condition followed by an "equal to" condition indicates that the last area read from the index track includes the track address to be selected.

Figure 2:
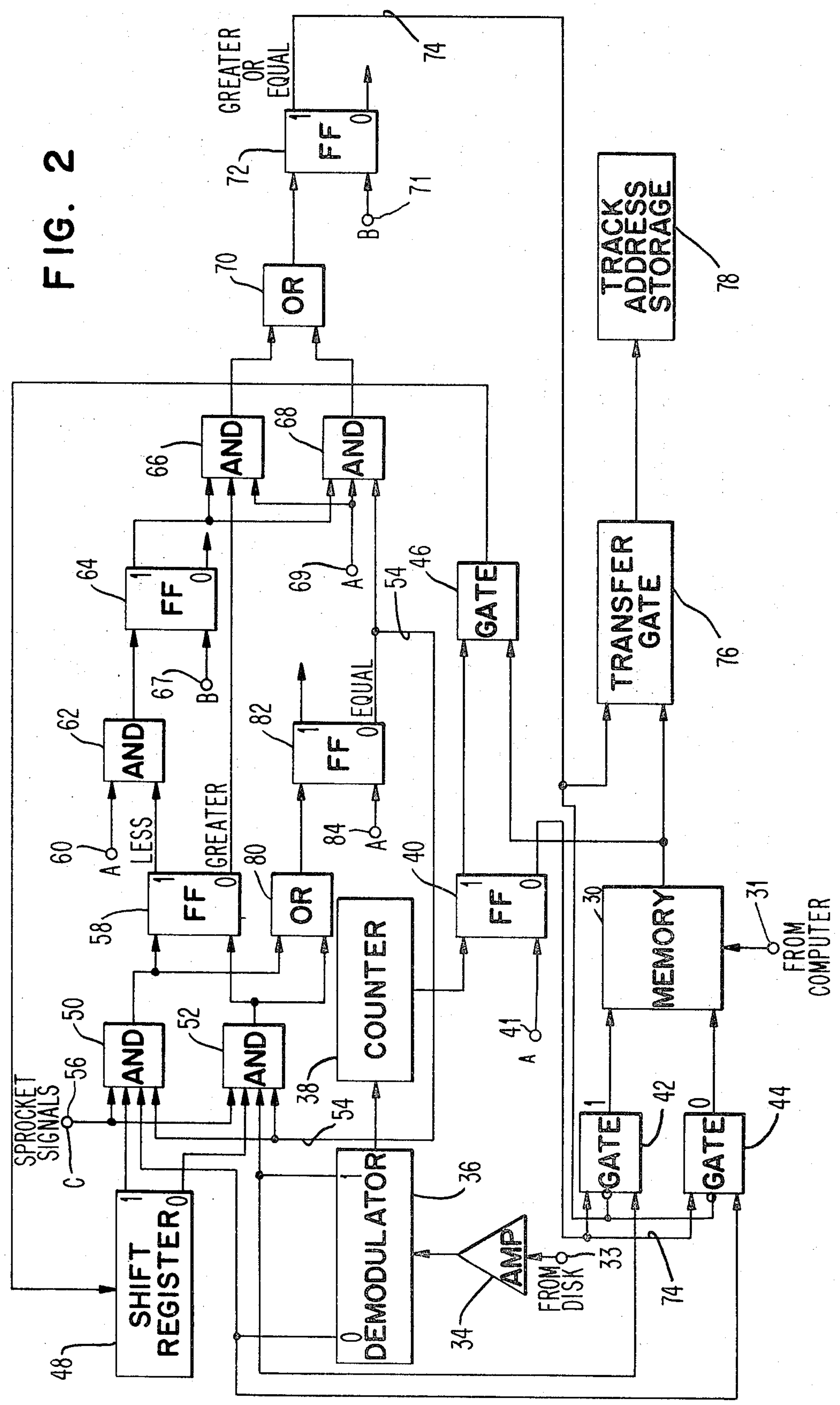
FIG. 2 illustrates in block diagram form a general random access system, in accordance with the present invention.

For purposes of explanation in connection with FIG. 2 the letters A, B and C are used to indicate signal sources which are connected to a number of different points. The letter C as used in FIG. 2 represents timing signals which occur for each bit period of the information involved. The letter A indicates timing signals generated for each group of digits, for example, once for each record involved. The letter B indicates timing signals generated at the start of each overall search operation.

Referring to FIG. 2, a block diagram of an over all system involving the present invention is illustrated. In general, bits of information from the recording medium such as the disc 10 illustrated in FIG. 1, are compared with binary coded bits of information relating to an incoming signal from a computer system. The information is compared bit by bit with the high order first and indications as to whether or not the information from the disc is greater than, less than, or equal to the numerical value of the incoming signal are obtained.

Signals, which may represent social security numbers, names, addresses or any other of a variety of items, may be fed into a memory 30 from an input terminal 31. These are the information signals which are compared with signals from the index track of the disc in order to determine the track location of the incoming information signals on the disc. In other words the identifier of a sector may be as long or as short as necessary and this limitation would depend upon the physical size of the sector of the disc.

In a preferred embodiment, the information on each sector of the index track includes the track address represented by a binary coded signal followed by the highest order alpha-numerical information (the identifier) of the track also represented by binary coded signals. For example, the first two bits stored in each sector of the index track of the disc may represent the track address, with the subsequent bits representing the highest order alpha-numeric key information on each of the respective tracks on the disc.

In a preferred embodiment, the first operation involves the storing of the track address signal from the index track in memory 30. This track address information is held until a comparison is made between the identifier of the computer information and the identifier of the disk information. The track address signals stored in the memory 30 will be held for one comparison unless there are proper conditions ("less than" followed by "greater than" or "equal to"). Thus, the track address signal in the memory 30 may be constantly changing during a search operation and the information relating to a social security number or the like, will remain fixed in the memory until the proper conditions are detected. Information from the disc 10 which includes the track address signal along with the highest order identifying signals from each of the tracks, is applied from a terminal 33 through an amplifier 34 to a demodulator circuit 36. The demodulator circuit, for example, may convert the incoming signals to NRZ (non return to zero) output signals wherein one signal level represents a binary "1" and the second level represents a binary "0." Various signals indicating the start of read and write operations, sentinel signals and other signals may also be recovered and used in a manner well known to those skilled in the computer field.

Such additional signals normally present in a computer system are not described for purposes of clarity.

When a search operation is commenced, output signals will be developed at the demodulator 36. The output signals from the demodulator 36 control the operation of a counter 38. The counter is designed to count up to two (i.e. the bits equal to two digits) generating a signal to set the "0" output of a flip-flop circuit 40 to a high condition. The "0" output of the flip-flop 40 is connected to a pair of AND gates 42 and 44. With the "0" output of the flip-flop 40 high during the first two digits, the gates 42 and 44 will permit the track address signals to pass therethrough. However after the counter 38 counts up to two digits, the flip-flop 40 is switched so that its "0" output is in a low state so as to inhibit the gates 42 and 44 from passing signals applied thereto from the demodulator 36. These latter signals represent the identifying signals stored on the index track of the disc.

The output signals from the demodulator 36, involving the first two digits received from the disc, representing the track address, pass through the AND gates 42 and 44 and are stored in the memory 30. After the two digits have been stored in the memory 30, the flip-flop 40 is caused to change operating states and its "0" output goes low, the gates 42 and 44 will then be inhibited to prevent any further signals from passing from the demodulator 36 to the memory 30.

The "1" output state of the flip-flop 40 is connected to control the operation of a gate circuit 46. When the gate 46 is in a permissive condition i.e. when flip-flop 40 has its "1" output high, output signals are applied therethrough from the memory 30 into a shift register 48. These output signals may be the social security numbers or other information stored in the memory 30 from the computer. The flip-flop 40 is reset by signals A at terminal 41.

The output signals from the gate circuit 46 applied to the shift register 48 may now be read out serially and compared with the signals from the demodulator 36. As mentioned these signals may be those from the index track of the disc. Thus, it may be said that the counter 38 acts to control the flip-flop 40 so that the gates 42 and 44 are permissive for the track address digits and inhibited for the subsequent signals representing the identifying numbers on the index track. In like manner, the gate 46 is inhibited for the first two digits representing the track address signals and permissive for the remaining digits of a group, stored in the memory 30.

The next operation is to determine whether the information stored in the memory 30, after the track address, is greater than, less than, or equal to the identifying signals read from the index track of the disc. Depending upon the condition detected, either the next subsequent identifying signal from the disc will be read into the memory 30 or the correct address will be transferred to a utilization circuit to control subsequent operations.

The "1" output of the shift register 48 and "0" output of the demodulator 36 are applied to an AND gate 50. In like manner, the "0" output of the shift register and the "1" output of the demodulator 36 are applied to an AND gate 52. As will be described later in detail, signals from line 54 which are indicative of whether or not there has been a difference between the bits from the register 48 and the demodulator 36 are also applied to the AND gate circuits 50 and 52. Initially this signal will be assumed to normally permit the passage of signals through the AND gate 50 and 52.

Sprocket signals C, generated each bit period by means which may be included in the demodulator 36 and not shown in detail, are also applied to the AND gates 50 and 52 through an input terminal 56.

When the output signal from the demodulator 36 is in the "0" state and less than the signal from the shift register 48, which may be in the "1" state, an output signal will be developed by the AND gate 50 to set a flip-flop circuit 58, i.e. cause its "1" state to be high. The high "1" output state of the flip-flop 58 indicates a "less than" condition, i.e. the fact that the high order bit signal read from the disc is less than the signal from the shift register, which is that supplied by the computer to the memory 30.

On the other hand if the AND gate 52 develops an output signal which indicates that the signal from the disc is higher than the signal from the memory, the flip-flop 58 will be reset so that its "0" output will be high indicating a "greater than" condition. As soon as either AND gate 50 or 52 experiences an output the flip-flop 82 is set to its ONE side and the low signal from the ZERO side inhibits the AND gate 50 and 52. Accordingly, no other comparisons for the two characters under consideration are effective.

At the end of each group of digits, for example, a social security number, a timing signal A is applied to a terminal 60. An output signal will be developed by an AND gate 62 when a "less" condition is indicated and a signal is applied to the terminal 60. The output signal from the AND gate 62 will set a flip-flop 64, i.e. cause its "1" state to be high. Thus it may be said that the flip-flop 64 will indicate the condition of a previous comparison whereas the flip-flop 58 may be set to indicate a present condition to permit a comparison of two consecutive groups of digits.

If a "greater than" condition is indicated by the flip-flop 58, both AND gates 66 and 68 are inhibited unless, at the same time, flip-flop 64 is indicating a previous "less than" condition with its "1" state high. If the flip-flop 64 does not indicate a previous "less than" condition and its "1" state is low, the AND gate circuits 66 and 68 will be inhibited and will not produce an output signal. It is noted that the flip-flop 64 is reset prior to an over all comparison operation by a signal B at terminal 67. Timing signals A are also applied to the AND gates 66 and 68 from the terminal 69.

If the flip-flop 64 is indicating a "less than" condition by its high "1" output and this condition is followed by a "greater than" condition indicated by a high "0" state at the flip-flop 58, the AND gate 66 will produce an output signal at the next A signal time. An output signal from the AND gate 66 is applied through an OR gate 70 to set a flip-flop 72, i.e. cause its "1" state to be high. When the flip-flop is set with its "1" state high, the condition indicates that the track address stored in the memory 30 is the correct one. At this point, the signal from the flip-flop 72 is applied through a line 74 to a transfer gate circuit 76. This permits the address signals stored in the memory 30 to be transferred into a track address storage device 78. The signal from the line 74 is also applied to the AND gates 42 and 44 to inhibit these gates to prevent any further address signal from passing from the disc into the memory 30.

Once the proper address has been found, a subsequent positioning operation involving the movement of the transducer to a selected track takes place. Since this positioning operation is not related to the present invention details relating thereto will not be included.

If the information signals in the shift register 48 and the disc are equal, neither of the AND gates 50 or 52 will generate output signals. No signals will pass through OR gate 80 to set the flip-flop 82. Reset signal A applied to the terminal 84 causes the "0" state of the flip-flop 82 to be high. When the "0" state of the flip-flop 82 is high and the "1" state of the flip-flop 64 is also high, a signal will pass through AND gate 68 at the next A signal. The signal from the AND gate 68 is applied to the flip-flop 72 through the OR gate 70. Thus it is seen that an "equal" signal following a "less" signal has the same result as a "less" signal followed by a "greater" signal.

If the information signals from the disc and the shift register are different, an output signal will be developed at the OR gate 80 to trigger the flip-flop 82. In this condition, the "1" output of the flip-flop 82 will be high indicating a non equal condition. If no output signals are developed by the OR gate 80, the flip-flop 82 will be reset by a signal A at the terminal 84. This will indicate an equal condition.

The "0" output of the flip-flop 82, indicating an equal condition, is applied to the AND gates 50 and 52 through a line 54 to inhibit the passage of signals through the AND gates 50 and 52. In addition, the high output of the "0" state of the flip-flop 82 causes the AND gate 68 to develop an output signal at the next A signal. This signal, in turn, is applied to set the flip-flop 72 through the OR gate 70. A signal at the line 74, indicating an equal condition is fed back to control the transfer gate 76 to permit transfer of information and to the gates 42 and 44 to inhibit passage of address signals into the memory 30.

It is apparent that the system may involve modifications. For example, a "greater than" followed by a "less than" condition may indicate a correct track address if the disc were rotated in a clockwise direction. Also, the recording medium could be a drum or other device. Other forms of logic other than that illustrated in FIG. 2 may be employed to accomplish the results described by the present invention.

What is claimed is:

1. A random access positioning system comprising a recording medium onto which information can be written and from which information can be read and wherein said recording medium has a plurality of information storage positions thereon, groups of said information storage positions being respectively assigned to different ones of a plurality of tracks on said recording medium and each information storage position having precessable information therein which is available for data processing thereof, each track having an address, at least one additional track of information included on said record medium, said additional track having segments of information therein, each segment including the address of one of said tracks and each segment further including the highest order of information to be processed which is located along the track whose address is contained in said segment, means for providing information to be sought from said record medium, and means for comparing the highest order information from said additional track with the information to be sought for the purpose of determining the address of the track along which the information to be sought is located.

2. The invention as set forth in claim 1 wherein said means for comparing includes means whereby signals representing the information sought may be sequentially compared with the highest order information in the segments on said additional track to detect the relationship therebetween.

3. The invention as set forth in claim 1 wherein the processable information is disposed along said tracks in said information storage positions in a predetermined order whereby the information in each succeeding information storage position is higher than the information in the prior information storage position along the track in a direction opposite to the rotation of the track.

4. The invention as set forth in claim 3 wherein said predetermined order comprises a numerical sequence.

References Cited

UNITED STATES PATENTS

| | | | |
|---|---|---|---|
| 2,969,525 | 1/1961 | Hill | 340—174.1 |
| 3,337,852 | 8/1967 | Lee et al. | 340—174.1 |

BERNARD KONICK, Primary Examiner

W. F. WHITE, Assistant Examiner